United States Patent
Ludtke

(10) Patent No.: US 6,763,391 B1
(45) Date of Patent: Jul. 13, 2004

(54) METHOD AND APPARATUS FOR MANAGING RESOURCE ALLOCATION AND A BANDWIDTH OVERFLOW IN A COOPERATIVE, DISTRIBUTED COMPUTING ENVIRONMENT

(75) Inventor: Aaron Ludtke, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 433 days.

(21) Appl. No.: 09/645,466

(22) Filed: Aug. 23, 2000

Related U.S. Application Data

(62) Division of application No. 09/041,217, filed on Mar. 12, 1998, now Pat. No. 6,272,546.

(51) Int. Cl.[7] .............................. G06F 15/16; G06F 3/00; H04N 7/20
(52) U.S. Cl. ..................... 709/231; 709/228; 710/19; 725/78
(58) Field of Search ................................. 709/231, 227, 709/228, 236, 213, 253; 710/15, 18, 19, 32, 110, 62; 725/78, 80, 82, 144, 146

(56) References Cited

U.S. PATENT DOCUMENTS

| | | | |
|---|---|---|---|
| 4,663,706 A | | 5/1987 | Allen et al. |
| 4,760,572 A | | 7/1988 | Tomikawa |
| 4,761,781 A | * | 8/1988 | Calvignac et al. .......... 370/352 |
| 4,897,727 A | | 1/1990 | Richards |
| 4,998,245 A | | 3/1991 | Tanaka et al. |
| 5,012,405 A | | 4/1991 | Nishikado et al. |
| 5,179,439 A | | 1/1993 | Hashimoto |
| 5,193,208 A | * | 3/1993 | Yokota et al. ................ 725/80 |
| 5,434,860 A | | 7/1995 | Riddle |
| 5,471,474 A | | 11/1995 | Grobicki et al. |
| 5,579,486 A | | 11/1996 | Oprescu et al. |

(List continued on next page.)

OTHER PUBLICATIONS

Rajapakshe, Harindra et al., "Video on demand", www-dse.doc.ic.ac.uk/~nd/surprise_95/journel/vol4/shr/report.html, pp. 1–16, Jun. 1995.*

Real Media, "RealMedia Overview", Progressive Networks, pp. 1–17, 1997.*

M. Vecchi, "A Cable Television Industry Viewpoint on IPng", http://www.geckil.com/~harvest/rfc/rfc168.txt, Aug. 1994, 1 of 13.

S. Floyd et al., "Link–Sharing and Resource Management Models for Packet Networks", IEEE/ACM Transactions on Networking., vol. 3, No. 4, Aug. 1995, pp. 365–386.

Dr. J. Seseña et al., "Digital TV Multiprogramme by Satellite—Converging to a World Wide Standard", International Broadcasting Convention, IEEE 1997, pp. 447 of 455.

S. Pekowsky et al., The Set–Top Box as: "Multi–Media Terminal", IEEE 1998, pp. 833 of 840.

(List continued on next page.)

*Primary Examiner*—Jason D. Cardone
(74) *Attorney, Agent, or Firm*—Haverstock & Owens LLP

(57) ABSTRACT

A method of and apparatus for managing resource allocation and bandwidth overflow manages data transmissions between a sourcing device and one or more listening devices through a single source plug. When a new selection request is submitted it is determined if the selection request will exceed the bandwidth capabilities of any devices. The selection request includes a warning bit, specifying whether or not the sourcing device should automatically free up the necessary bandwidth and implement the selection or reject the selection request and warn the requesting device. When selections are implemented, the sourcing device maintains a record of each requesting device which has requested a selection. Then, when a device requests that a selection be cleared, the status of a scope bit within the request is determined. The scope bit specifies whether or not the selection should be cleared if other devices are also associated with the selection.

9 Claims, 4 Drawing Sheets

U.S. PATENT DOCUMENTS

| | | | |
|---|---|---|---|
| 5,579,496 A | | 11/1996 | Van Steenbrugge |
| 5,615,401 A | | 3/1997 | Harscoet et al. |
| 5,692,211 A | | 11/1997 | Gulick et al. |
| 5,719,942 A | | 2/1998 | Aldred et al. |
| 5,721,584 A | | 2/1998 | Yoshinobu et al. |
| 5,729,765 A | * | 3/1998 | Cheng ........................ 710/53 |
| 5,742,847 A | | 4/1998 | Knoll et al. |
| 5,758,086 A | | 5/1998 | Maegawa |
| 5,761,507 A | | 6/1998 | Govett |
| 5,774,671 A | | 6/1998 | Satoh |
| 5,899,578 A | * | 5/1999 | Yanagihara et al. .......... 386/75 |
| 5,905,942 A | * | 5/1999 | Stoel et al. ................... 725/78 |
| 5,925,104 A | | 7/1999 | Elbers et al. |
| 5,983,275 A | | 11/1999 | Ecclesine |
| 6,049,823 A | | 4/2000 | Hwang |
| 6,055,560 A | | 4/2000 | Mills et al. |
| 6,058,307 A | | 5/2000 | Garner |
| 6,065,059 A | | 5/2000 | Shieh et al. |
| 6,081,533 A | | 6/2000 | Laubach et al. |
| 6,081,830 A | | 6/2000 | Schindler |
| 6,105,134 A | | 8/2000 | Pinder et al. |
| 6,108,718 A | | 8/2000 | Fujimori et al. |
| 6,125,396 A | | 9/2000 | Lowe |
| 6,128,316 A | | 10/2000 | Takeda et al. |
| 6,134,584 A | | 10/2000 | Chang et al. |
| 6,260,063 B1 | * | 7/2001 | Ludtke et al. .............. 709/224 |
| 6,272,546 B1 | * | 8/2001 | Ludtke ........................ 709/231 |
| 6,292,844 B1 | * | 9/2001 | Smyers et al. ................. 710/5 |
| 6,332,176 B1 | * | 12/2001 | Fang et al. ................. 711/113 |

OTHER PUBLICATIONS

Y. C. Shim et al., "Extension and Design of Secure Dynamic Updates in Domain Name Systems", Hong–Ik University, Dept. of Computer Engineering, pp. 1147 of 1150.

"TiVo Improves Industry's Best Personal Television Service", http://www.tivo.com/flash.asp?page=discover index, pp. 1 of 4.

"The IEEE–1394 High Speed Serial Bus," R.H.J. Bloks, Philips Journal Of Research, vol. 50, No. 1/2, pp. 209–216, 1996.

Michael Teener et al., "A Bus on a Diet—The Serial Bus Alternative, An Introduction to the P1394 High performance Serial Bus" Apple Computer, Inc. Santa Clara, CA, Pub. Date.: Feb. 24, 1992, pp. 316–321.

"P1394 Standard for a High Performance Serial Bus," IEEE P1394 Draft 8.0v2, Jul. 7, 1995.

* cited by examiner

METHOD AND APPARATUS FOR MANAGING RESOURCE ALLOCATION AND A BANDWIDTH OVERFLOW IN A COOPERATIVE, DISTRIBUTED COMPUTING ENVIRONMENT

This is a divisional of U.S. patent application Ser. No. 09/041,217, filed Mar. 12, 1998 now U.S. Pat. No. 6,272,542, the contents of which are hereby incorporated by reference.

FIELD OF THE INVENTION

The present invention relates to the field of managing the transmission of data between devices. More particularly, the present invention relates to the field of managing allocation of resources and bandwidth capabilities during the transmission of data between devices.

BACKGROUND OF THE INVENTION

The IEEE standard, "IEEE 1394 Standard For A High Performance Serial Bus," Draft ratified in 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394-1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-1995 cable. The physical layer 16 also provides arbitration to ensure that all devices coupled to the IEEE 1394-1995 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

An exemplary IEEE 1394-1995 consumer entertainment system network including a settop box, a satellite dish, a television and a digital video cassette recorder (VCR) is illustrated in FIG. 2. The settop box 20 is coupled to receive broadcast transmissions from the satellite dish 18 by the IEEE 1394-1995 cable 26. Typically, these broadcasts are transmitted from the satellite dish 18 to the settop box 20 in an MPEG format. The settop box 20 is coupled to the television 22 by the IEEE 1394-1995 cable 28. The television 22 is coupled to the digital VCR 24 by the IEEE 1394-1995 cable 30. Through the single plug coupled to the IEEE 1394-1995 cable 28, the tuner 20 transmits broadcasts from the satellite dish 18 to the television 22 and the digital VCR 24.

The AV/C Digital Interface Command Set is a command set used for transactions between consumer audio/video equipment over an IEEE 1394-1995 serial bus. Neither the IEEE 1394-1995 serial bus nor the AV/C Command Set provide a master-slave relationship between the devices coupled within the IEEE 1394-1995 serial bus network. Instead, both the IEEE 1394-1995 serial bus and the AV/C Command Set operate based on the cooperative coexistence of devices within the network.

As discussed above, an IEEE 1394-1995 device includes the capability to transmit and receive isochronous data over multiple channels. However, in current implementations, certain IEEE 1394-1995 devices are being built with the capability to only transmit isochronous data over a single channel through a single source plug and receive isochronous data over a single channel through a single destination plug. This implementation allows manufacturers to make less expensive devices, but can cause problems and conflicts between devices sharing the data that is transmitted through the single source plug. Certain problems are envisioned in the manner that data streams will be controlled over the IEEE 1394-1995 serial bus particularly in the areas of multiple simultaneous selections and bandwidth management and device overflow. Multiple simultaneous selections present a problem when several controllers are utilizing a single source, such as a tuner subunit. There is presently no fixed relationship between the amount of information that can be selected by a sourcing device, such as the tuner 20, and the means by which that information is made available to other subunits outside of the sourcing device, over the IEEE 1394-1995 serial bus, through the sourcing device's source plugs. Current implementations however, allow a sourcing device to support only a single source plug.

As illustrated within the exemplary network of FIG. 2, the tuner or settop box 20 is coupled to the satellite dish 18 by the IEEE 1394-1995 cable 26 to receive broadcast transmissions from the satellite dish 18. The tuner 20 through a single source plug provides the broadcast transmissions to the television 22 and the digital VCR 24 over the IEEE 1394-1995 serial bus. It is possible for the tuner subunit 20 to receive, decode and distribute several select broadcasts received from the satellite dish 18, thereby supporting many individual selection requests. This support is limited only by the bandwidth of the IEEE 1394-1995 serial bus and the capabilities of the tuner 20. For example, the tuner 20 can simultaneously receive, decode and distribute the CNN® and BBC® broadcast services. Because there is only one plug through which the tuner 20 is transmitting, the data representing these broadcasts is multiplexed from the tuner 20 through the single source plug, with alternating packets of both broadcasts on the single IEEE 1394-1995 isochronous channel and distributed to the television 22 and the digital VCR 24, as appropriate.

Problems arise when the data on the shared isochronous channel conflicts or exceeds the bandwidth of one of the devices. Illustrative of the problems that can arise in such a situation is the example of two controllers selecting the same service at the same time. In such a situation, both the television 22 and the digital VCR 24 request that the tuner 20 transmit the same service, such as the CNN® broadcast. The tuner 20 then receives, decodes and transmits the CNN® broadcast to the television 22 and the digital VCR 24. However, if the television 22 later sends a request to have the CNN® broadcast selection removed, the tuner 20 will remove the service from the data transmitted through the single source plug over the IEEE 1394-1995 serial bus. This process of removing the selection from the data transmitted by the tuner 20, results in the service being removed from the data transmitted through the source plug altogether, even though the other controller (digital VCR 24) still expected the tuner 20 to transmit the service. Currently controllers, such as the television 22 and the digital VCR 24, have no way of sharing a sourcing device's resources in a manner that prevents or minimizes this kind of a conflict.

A diverse range of products can be implemented with the ability to connect to an IEEE 1394-1995 serial bus network. These devices can have capabilities and functionality ranging from very simple to very complex. The IEEE 1394-1995 serial bus allows a collection of devices to work together in a high bandwidth, distributed environment to maximize the overall efficiency and functionality of the network. This allows manufacturers to remove expensive pieces of functionality from one device and locate that functionality in another device on the network, instead of duplicating this functionality in all devices on the network. While some of the devices have limited functionality and are relatively inexpensive, such devices require the support and interaction of other devices in order to bring the full functionality of the devices within the network to the user.

A tuner 20 is typically required to have decoding capability. This means that a storage device, such as the digital VCR 24, coupled within an IEEE 1394-1995 serial bus network with the tuner 20, can be built without a decoder. The digital VCR 24 would then rely on the tuner 20 to perform any necessary decoding of data received or transmitted by the digital VCR 24. In such a network, when the user records a transmission from the tuner 20, the digital VCR 24 is only used as a storage device, thereby storing whatever is transmitted to it by the tuner 20. When the user later wants to view the recorded transmission, the digital VCR 24 transmits the stored transmission back to the tuner 20 for decoding. The tuner 20 then decodes the recorded transmission and transmits the decoded data to the appropriate presentation device, such as the television 22. Problems arise in this scenario when the devices receiving data from the tuner 20 request services having a bandwidth which would overload the digital VCR 24. The digital VCR 24 can request that the tuner transmit services such as the CNN® and BBC® broadcasts, so that the digital VCR 24 can record these transmissions for later playback. The CNN® and BBC® broadcasts are then transmitted from the tuner 20 through the single source plug, over the IEEE 1394-1995 serial bus network, on the isochronous channel in use. In this example, the digital VCR 24 has the available bandwidth to record both of these broadcasts together. However, if the television 22, then requests that the tuner 20 also transmit another service or selection, the digital VCR 24 may not have the capacity to handle the additional bandwidth. In this case, the results are currently unpredictable, and it is likely that the digital VCR 24 will not properly record the transmission including the CNN® and BBC® broadcasts. Currently controllers have no way of sharing the tuner's resources in a manner that prevents or ensures that the bandwidth of another device is not exceeded with the addition of new selections.

SUMMARY OF THE INVENTION

A method of distributing content selections within a single data stream to a network including a plurality of devices comprises the steps of maintaining a record which associates content selections with a requesting device, receiving a clear command from a clearing device, wherein the clear command includes a scope notification specifying whether or not the clear command is to clear a specified content selection regardless of the devices associated with the specified content selection, disassociating all devices from the specified content selection if the scope notification specifies that the clear command is to clear the specified content selection regardless of the devices associated with the specified content selection, disassociating only the clearing device from the specified content selection if the scope notification does not specify that the clear command is to clear the specified content selection regardless of the devices associated with the specified content selection and clearing the specified content selection if no devices are associated with the specified content selection. The scope notification is preferably a single bit. The network is preferably an IEEE 1394 serial bus network. The single data stream is transmitted through a single source plug of a sourcing device. The plurality of devices preferably includes one or more sourcing devices and one or more listening devices. The requesting device can be one of the one or more listening devices.

A method of providing content selections to one or more listening devices from a sourcing device within a single data stream comprises the steps of receiving a content command from a requesting device to add a requested content selection to the single data stream, wherein the content command includes a warning notification specifying whether or not the content command is to be executed even if the requested content selection will exceed bandwidth capabilities of any one of the sourcing device and the listening devices, determining if addition of the requested content selection to the single data stream will exceed bandwidth capabilities of any one of the sourcing device and the listening devices, clearing one or more existing content selections within the single data stream and adding the requested content selection to the single data stream if the warning notification specifies that the content command is to be executed even if the requested content selection will exceed bandwidth capabilities of any one of the sourcing device and the listening devices and it is determined that addition of the requested content selection will exceed the bandwidth capabilities of any one of the sourcing device and the listening devices and rejecting the content command if the warning notification specifies that the content command is not to be executed if the requested content selection will exceed bandwidth capabilities of any one of the sourcing device and the listening devices and it is determined that addition of the requested content selection will exceed the bandwidth capabilities of any one of the sourcing device and the listening devices. The method further includes the step of sending an error message from the sourcing device to the requesting device if the warning notification specifies that the content command is not to be executed if the requested content selection will exceed the bandwidth capabilities of any one of the sourcing device and the listening devices and it is determined that addition of the requested content selection will exceed the bandwidth capabilities of any one of the sourcing device and the listening devices. The warning notification is preferably a single bit. The listening devices and the sourcing device are preferably coupled together within a network. Preferably, the network is an IEEE 1394 serial bus network. The single data stream is transmitted through a single source plug of the sourcing device.

A sourcing device for providing content selections to one or more listening devices within a single data stream comprises an interfacing circuit configured to couple to the one or more listening devices and a controlling circuit coupled to the interfacing circuit for controlling the content selections that are included within the single data stream, wherein the controlling circuit maintains a record which associates content selections with a requesting device. The interfacing circuit includes a source plug through which the single data stream is transmitted to the one or more listening devices. A clearing device clears a previous content selection by sending a clear command to the sourcing device and further wherein the clear command includes a scope notification specifying whether or not the clear command is to clear a specified content selection regardless of the devices associated with the specified content selection.

The controlling circuit disassociates all devices from the specified content selection after receiving the clear command if the scope notification specifies that the clear command is to clear the previous content selection regardless of the devices associated with the specified content selection. The controlling circuit disassociate only the clearing device from the specified content selection if the scope notification does not specify that the clear command is to clear the specified content selection regardless of the devices associated with the specified content selection. The controlling circuit clear the specified content selection if no devices are associated with the specified content selection.

A requesting device adds a requested content selection by sending a content command to the sourcing device including a warning notification specifying whether or not the content command is to be executed even if the requested content selection will exceed bandwidth capabilities of any one of the sourcing device and the listening devices. The controlling circuit clears one or more existing content selections within the single data stream and adds the requested content selection to the single data stream if the warning notification specifies that the content command is to be executed even if the requested content selection will exceed bandwidth capabilities of any one of the sourcing device and the listening devices and it is determined that addition of the requested content selection will exceed the bandwidth capabilities of any one of the sourcing device and the listening devices. The controlling circuit rejects the content command if the warning notification specifies that the content command is not to be executed if the requested content selection will exceed bandwidth capabilities of any one of the sourcing device and the listening devices and it is determined that addition of the requested content selection will exceed the bandwidth capabilities of any one of the sourcing device and the listening devices.

The controlling circuit sends an error message to the requesting device if the warning notification specifies that the content command is not to be executed if the requested content selection will exceed the bandwidth capabilities of any one of the sourcing device and the listening devices and it is determined that addition of the requested content selection will exceed the bandwidth capabilities of any one of the sourcing device and the listening devices. The warning notification is preferably a single bit. The scope notification is preferably a single bit. The listening devices and the sourcing device are preferably coupled together within a network. The network is preferably an IEEE 1394 serial bus network. The requesting device can be one of the listening devices.

A system network comprises a plurality of listening devices coupled together within a network to send and receive communications and a sourcing device coupled to the plurality of listening devices to provide content selections to the listening devices within a single data stream, the sourcing device includes an interfacing circuit including a source plug coupled to the network through which the single data stream is transmitted and controlling circuit coupled to the interfacing circuit for controlling the content selections that are included within the single data stream. The controlling circuit maintains a record which associates content selections with a requesting device, wherein a clearing device clears a previous content selection by sending a clear command to the sourcing device. The clear command includes a scope notification specifying whether or not the clear command is to clear a specified content selection regardless of the devices associated with the specified content selection. A requesting device adds a requested content selection to the single data stream by sending a content command to the sourcing device including a warning notification specifying whether or not the content command is to be executed even if the requested content selection will exceed bandwidth capabilities of any one of the sourcing device and the listening devices.

The network is preferably an IEEE 1394 serial bus network. The controlling circuit clears one or more existing content selections within the single data stream and adds the requested content selection to the single data stream if the warning notification specifies that the content command is to be executed even if the requested content selection will exceed bandwidth capabilities of any one of the sourcing device and the listening devices and it is determined that addition of the requested content selection will exceed the bandwidth capabilities of any one of the sourcing device and the listening devices. The controlling circuit rejects the content command if the warning notification specifies that the content command is not to be executed if the requested content selection will exceed bandwidth capabilities of any one of the sourcing device and the listening devices and it is determined that addition of the requested content selection will exceed the bandwidth capabilities of any one of the sourcing device and the listening devices. The controlling circuit sends an error message to the requesting device if the warning notification specifies that the content command is not to be executed if the requested content selection will exceed the bandwidth capabilities of any one of the sourcing device and the listening devices and it is determined that addition of the requested content selection will exceed the bandwidth capabilities of any one of the sourcing device and the listening devices.

The controlling circuit disassociates all devices from the specified content selection after receiving the clear command if the scope notification specifies that the clear command is to clear the previous content selection regardless of the devices associated with the specified content selection. The controlling circuit disassociates only the clearing device from the specified content selection if the scope notification does not specify that the clear command is to clear the specified content selection regardless of the devices associated with the specified content selection. The controlling circuit will clear the specified content selection if no devices are associated with the specified content selection. The requesting device can be one of the plurality of listening devices.

A method of distributing content selections within a single data stream to a network including a plurality of devices comprises the steps of adding a content selection requested by a requesting device to the single data stream, incrementing a count value when the step of adding is completed, decrementing the count value when a clear command for the content selection is received and clearing the content selection from the single data stream when the count value is equal to zero. The clear command includes a scope notification specifying whether or not the clear command is to clear the content selection regardless of the count value. The method further comprises the step of clearing the content selection if the clear command is to clear the content selection regardless of the count value. The scope notification is preferably a single bit. The network is preferably an IEEE 1394 serial bus network. The single data stream is transmitted through a single source plug of a sourcing device. The plurality of devices preferably includes one or more sourcing devices and one or more listening devices. The requesting device can be one of the one or more listening devices.

DETAILED DESCRIPTION OF THE PREFERRED EMBODIMENT

Figure 1:
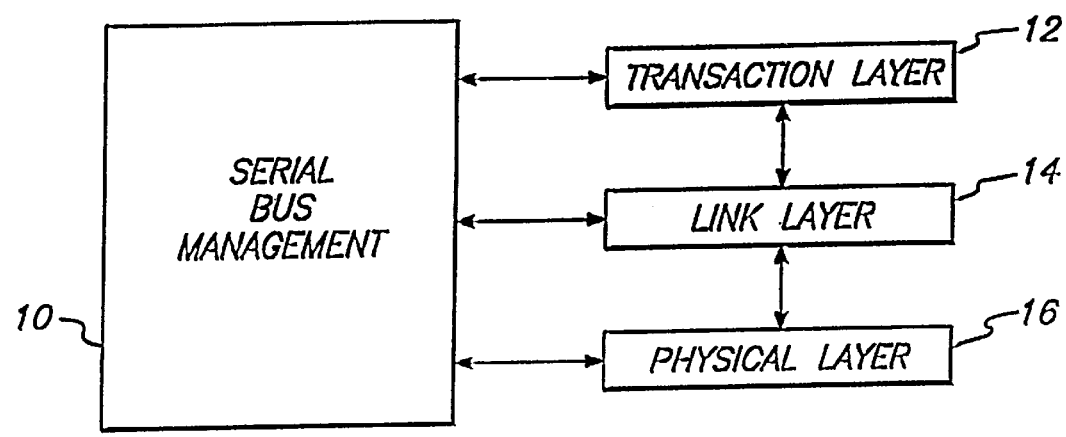
FIG. 1 illustrates the protocol layers defined by the IEEE 1394-1995 standard.
Figure 2:
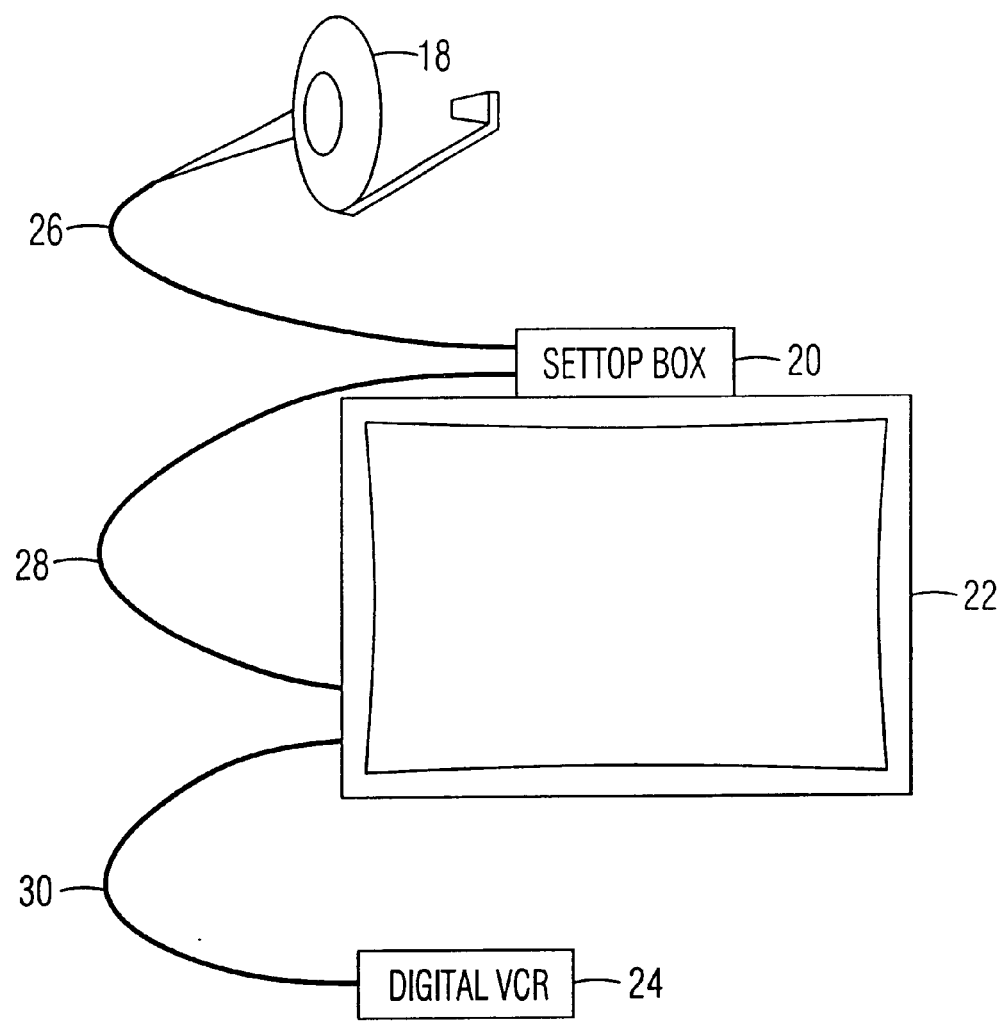
FIG. 2 illustrates an exemplary IEEE 1394-1995 consumer entertainment system network including a settop box, a satellite dish, a television and a digital VCR.

The method of and apparatus for managing resource allocation and bandwidth overflow in a cooperative, distributed computing environment of the present invention manages data transmissions between a sourcing device and one or more listening devices to attempt to cooperatively avoid, resolve and minimize conflicts. When a new selection request is submitted to a sourcing device, the sourcing device first determines if the selection request will exceed its bandwidth capabilities or the bandwidth capabilities of any of the devices listening to the corresponding source plug. If the new selection request will cause the bandwidth of either the sourcing device or a listening device to be exceeded, the selection request will either be implemented by the sourcing device after one or more selections are cleared to provide the necessary bandwidth for the new selection request or the new selection request will be rejected by the sourcing device and an error message will be sent to the requesting device describing the reason for the rejection. The sourcing device makes the determination of whether or not to accept such a request based on the status of a warning bit within the command frame. If the selection request is rejected, the user can then determine the appropriate action to be followed, through the requesting device. The appropriate action can include abandoning the request at the current time, renewing the request and specifying the selections which should be cleared or renewing the request and specifying that the sourcing device should determine the selections to clear in order to implement the request.

Once a new selection request is approved, the sourcing device will implement the selection and add the selection to the data stream transmitted from the source plug. The sourcing device then preferably maintains a record of the selection associated with the requesting device until the selection is cleared. The requesting device can be, but is not required to be one of the listening devices receiving the data stream transmitted from the source plug. The requesting device can be a controlling device coupled within the network which does not receive the data stream transmitted from the source plug.

A scope bit is included within command frames in order to specify whether a command should affect only selections made by the device issuing the command frame or all selections, regardless of the initial requesting device or devices associated with the selection. A selection can preferably be cleared either by a device which had previously requested the selection or by another device specifying that the selection should be cleared regardless of the devices associated with that selection. If a device which had previously requested a selection requests that the selection be cleared, and the scope bit within the command frame specifies that only selections of that device are to be cleared, then the selection will only be cleared if no other devices are currently associated with that selection.

Figure 3:
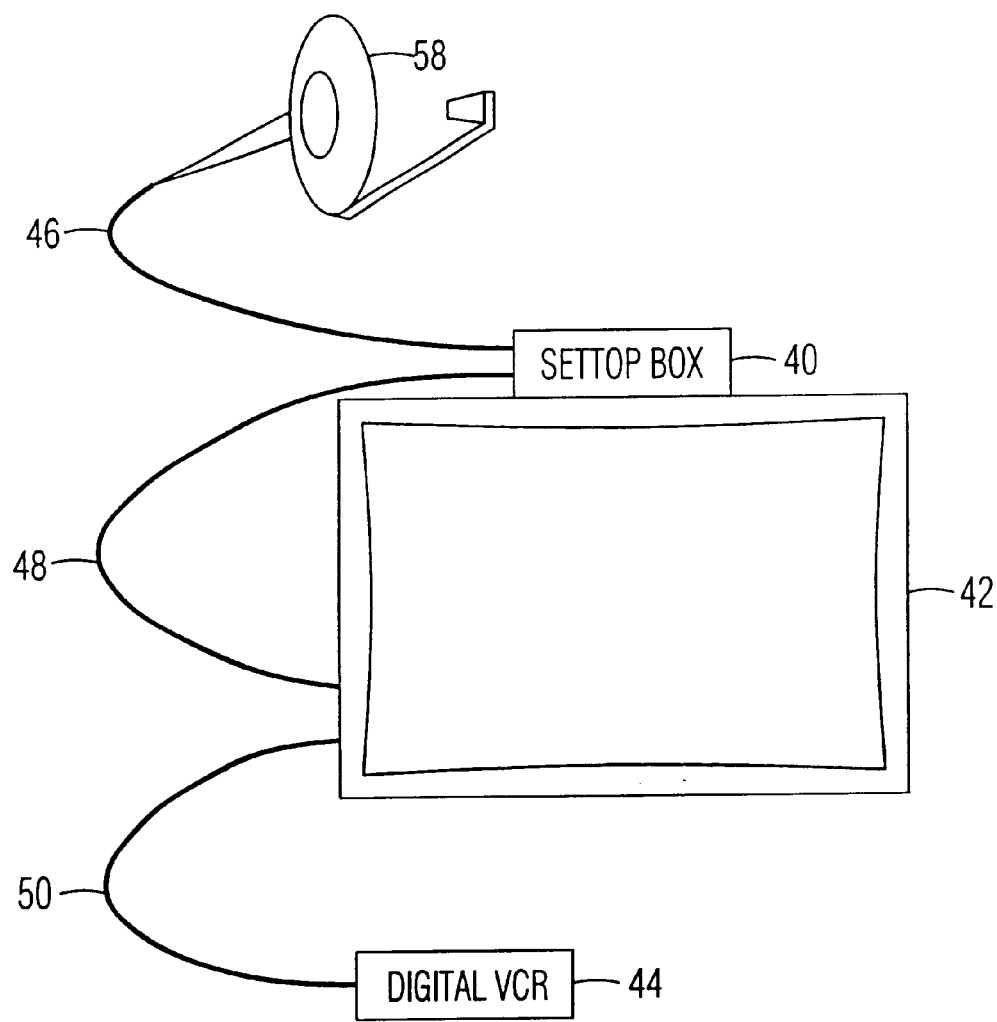
FIG. 3 illustrates an exemplary IEEE 1394-1995 consumer entertainment system network including a settop box, a satellite dish, a television and a digital VCR, implementing the present invention.

An exemplary IEEE 1394-1995 consumer entertainment system network implementing the present invention and including a tuner or settop box, a satellite dish, a television and a digital VCR is illustrated in FIG. 3. The settop box 40 is coupled to receive broadcast transmissions from the satellite dish 58 by the IEEE 1394-1995 cable 46. The settop box 40 is also coupled to the television 42 by the IEEE 1394-1995 cable 48. The television 42 is coupled to the digital VCR 44 by the IEEE 1394-1995 cable 50. Through the single source plug coupled to the IEEE 1394-1995 cable 48, the tuner 40 transmits broadcasts from the satellite dish 58 to the television 42 and the digital VCR 44.

Figure 4:
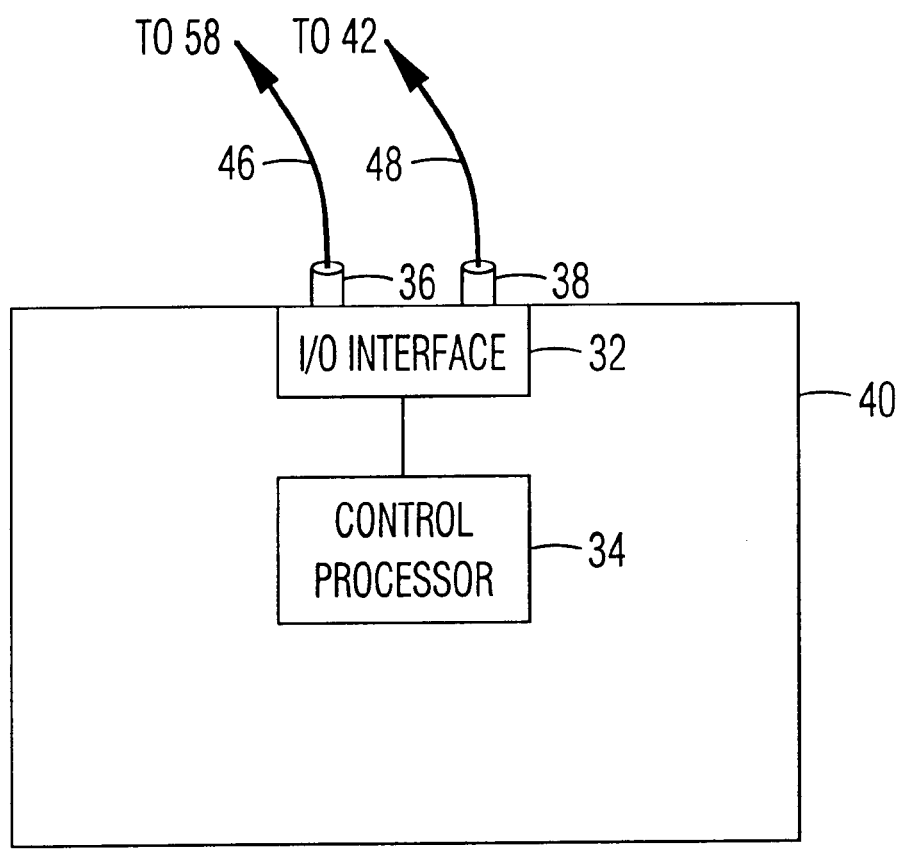
FIG. 4 illustrates a block diagram of a hardware system resident within a sourcing device of the present invention.

A block diagram of a hardware system resident in the tuner or sourcing device 40 of the present invention is illustrated in FIG. 4. In the hardware system illustrated in FIG. 3, a control processor 34 is coupled to an I/O interface circuit 32. Preferably, the I/O interface circuit 32 is an IEEE 1394-1995 physical transceiver circuit including two plugs 36 and 38. The plug 36 is coupled to the IEEE 1394-1995 cable 46 which is also coupled to the satellite dish 58. The plug 38 is coupled to the IEEE 1394-1995 cable 48 which is also coupled to the television 42. The control processor 34 implements the instructions and commands necessary to achieve the resource allocation and bandwidth management of the present invention. The use of the term 'control processor' is not intended to imply that such a system must be a general purpose computing circuit. Rather, this circuit could be implemented with a general purpose controller or special purpose circuit.

Within the embodiment of the present invention illustrated in FIG. 3 and discussed herein, the exemplary sourcing device is the tuner or settop box 20. However, it should be apparent that the resource allocation and bandwidth manager of the present invention can also be implemented within any other appropriate sourcing device including but not limited to a hard disk drive, a CD Rom drive, a read/write video disc, a mini disc, a video tape device and a CD player. It should also be apparent that the content selections can be of any appropriate format including but not limited to audio, video and MIDI.

The present invention includes a selection tagging mechanism in order to appropriately tag selections and ensure that once a controller requests a service and the service is delivered, that the service will continue to be delivered until that controller requests that the service be removed or until another device intentionally clears the service from the source plug, regardless of the number of devices which had previously requested the service. The sourcing device associates the ID of the requesting controller with all of the selections that the controller has placed on each source plug. Whenever a controller makes a selection request, the selection will be tagged with the requesting controller's unique ID. If a controller later requests that one of its previous selections be removed, the sourcing device will determine if that selection is associated with any other controlling devices. If the selection is associated with other devices, the sourcing device will not remove the selection, but will disassociate the requesting device from the selection.

It is also necessary however, to allow a controller the ability to essentially clear all selections from a source plug. Accordingly, within the preferred embodiment of the present invention, a scope bit is included within the selection command frames. The scope bit is included as the most significant bit within the subfunction operand of the command frame. The scope bit specifies whether the command is for the entire plug or for only those selections made by the requesting controller. Within the preferred embodiment of the present invention, if the scope bit has a value equal to a logical zero, then the scope of the command relates to the entire plug. Correspondingly, if the scope bit has a value equal to a logical one then the scope of the command relates to only those selections made by the requesting controller. For example, if the controller issues a selection command with the clear subfunction, having a scope bit equal to a logical one, then the sourcing device will clear from the source plug only those selections previously made by the requesting controller. As described above, if another controlling device is also associated with any of the selections, they will not be cleared and the requesting controller will be disassociated from those selections. If the controller issues a command to clear a selection, having a scope bit equal to a logical zero, then the sourcing device will clear the selection from the source plug, regardless of the number of controllers that initially requested the selection.

Inclusion of the scope bit within the command frame retains the cooperative model of the AV/C Command Set, but allows two or more controllers to cooperatively share a single source plug. The scope bit also allows controllers to avoid accidental conflict with other controllers. Only if the scope bit is set to a logical zero will a controller have the ability to change selections made by other controllers.

When receiving a command frame from a requesting controller, a sourcing device will maintain the ID of the requesting controller with that request, as long as the request is still pending. The sourcing device will only clear the request if the requesting controller clears it or if another controller sends a clear command frame to the sourcing device having a scope bit set to a logical zero, specifying that the selection should be cleared from the source plug regardless of the other controllers that may be associated with the selection.

In the network illustrated in FIG. 3, both the digital VCR 44 and the television 42 are requesting controllers and have the ability to request services from the sourcing device or tuner 40. As described above, the tuner 40 receives broadcasts from the satellite dish 58 and transmits those broadcasts through the single source plug 38 to the television 42 and the digital VCR 44. In the present invention, if the television 42 requests that the tuner 40 deliver a CNN® broadcast transmission, the tuner 40 will associate that request with the television's ID number, which for this example will be "42." This selection is then conceptually illustrated in the Table I below which includes the record preferably maintained by the sourcing device 40.

TABLE I

First Selection By Television

| Plug Number | Selection Specification | Owner ID |
|---|---|---|
| 1 | CNN ® | 42 |

If later, the digital VCR 44 requests that the tuner 40 deliver the CNN® broadcast transmission and a BBC® broadcast transmission through the source plug 38, the tuner 40 will associate both of those requests with the digital VCR's ID number, which for this example will be "44." These selections and the previous selection by the television 42, are conceptually illustrated in the Table II below, which includes the records preferably maintained by the sourcing device 40.

TABLE II

Selections By Television And VCR

| Plug Number | Selection Specification | Owner ID | Owner ID |
|---|---|---|---|
| 1 | CNN ® | 42 | 44 |
| 1 | BBC ® | 44 | |

If the digital VCR 44 then sends a clear command to clear all of its selections having a scope bit equal to a logical one, the tuner 40 will clear all of the services which had previously been requested by the digital VCR 44. In reality, the tuner 40 will only clear the BBC® broadcast transmission from the data stream transmitted through the source plug 38. Because the scope bit of the clear command was equal to a logical one, the services requested by other controllers, such as the television 42, are not cleared from the source plug 38. Because the tuner 40 had associated both the television 42 and the digital VCR 44 with the selection of the CNN® broadcast transmission, when the digital VCR 44 requested that the CNN® broadcast be removed from the source plug 38, the tuner 40 recognized that the television 42 still expected that transmission. Therefore, instead of removing the CNN® broadcast transmission from the data stream transmitted through the source plug 38, the tuner 40 only disassociated that selection from the digital VCR 44. The selection record within the tuner 40 will then include only the CNN® selection requested by the television 42.

If the digital VCR 44 had sent a clear command to clear the CNN® broadcast transmission having a scope bit equal to a logical zero, then the tuner 40 would have disassociated all of the devices from that selection and then cleared the selection from the data stream transmitted through the source plug 38. In this manner, one device, requiring additional bandwidth or only a specific stream of data from a sourcing device, has the ability through the scope bit to issue a clear command which will clear selections made by other devices.

Within an alternate embodiment of the present invention, instead of maintaining the IDs of devices making selection requests, a sourcing device will only maintain a count for each selection. This count will equal the number of separate devices which have requested a service. When a controller removes a selection, the count for that selection will be decremented. In this embodiment, the scope bit is not utilized within a command frame. Accordingly, a selection is only removed from the data stream transmitted from the sourcing device when the count for that selection is equal to zero. In a still further alternate embodiment, the selection count value and the scope bit are both utilized. In this embodiment, a selection is only removed from the data stream transmitted from the sourcing device when the count for that selection is equal to zero, or a requesting device has sent a clear command frame to the sourcing device with a scope bit equal to a logical zero, specifying that all selections should be cleared from the source plug.

The present invention also manages the bandwidth delivered within a data stream transmitted through a single source plug in order to avoid overloading either a sourcing device or a listening device receiving the stream of data from the sourcing device through the source plug. Within an alternate embodiment of the present invention, a controlling device is allowed to reserve a source plug on the sourcing device. When a controlling device finds an unreserved plug at the sourcing device to which it is coupled, the controlling device can reserve that source plug. By reserving the source plug, the controlling device is the only device with the ability to add or clear selections from the data stream transmitted through the source plug. This reservation will prevent other controlling devices from issuing selection requests to the sourcing device that would affect the reserved source plug and the controlling device which had reserved the source plug. This is not the preferred solution however, because it fosters a less cooperative environment among the devices and allows certain devices to monopolize the content of a data stream transmitted through a source plug.

Within the preferred embodiment of the present invention, it is recognized that the user of the devices within an IEEE 1394-1995 serial bus network is the ultimate decision maker who should resolve all conflicts between devices concerning bandwidth. However, it is also recognized that the user should be fully informed when making these decisions. To prevent the accidental overloading of devices on the IEEE 1394-1995 serial bus network, all devices listening to a particular source plug are required to register with the sourcing device which is transmitting the stream of data through the source plug. When registering with the sourcing device, a listening device specifies its bandwidth capabilities. With this information, the sourcing device can notify the user when a particular device will be overloaded by a selection that has been requested to be transmitted within the data stream from a source plug. The user can then decide the appropriate resolution of this conflict.

Within an alternative embodiment of the present invention, only the devices which could potentially have a bandwidth problem will register with the sourcing device. Within this alternate embodiment, listening devices that include the ability to decode only the selections that they have requested will not have to register with the sourcing device.

By registering with the sourcing device and specifying its bandwidth capabilities, a listening device can ensure that the sourcing device will not overload it with a stream of data having a bandwidth beyond its capabilities. When the sourcing device receives a selection request it will first validate the request to determine if any of the devices listening to the source plug will be overloaded by the request. If the selection request is validated and it is determined that none of the listening devices will be overloaded by the additional selection, the sourcing device will complete the request and add the selection to the stream of data from the source plug. If however, the selection request cannot be validated because it will overload one of the devices listening to the source plug, then the sourcing device must decide whether or not to complete the request.

Within the selection command frame of the preferred embodiment, a warning bit is included. The warning bit is preferably included as the second most significant bit within the subfunction operand of the command frame. This warning bit specifies whether or not the sourcing device should complete a selection request even if it will cause the bandwidth of another device to be overloaded. Within the preferred embodiment of the present invention, if the warning bit has a value equal to a logical zero, then the sourcing device will complete the command regardless of the bandwidth of the other listening devices. In this situation, if an additional selection will exceed the bandwidth of a listening device and the warning bit is set to a logical zero, then the sourcing device will decide which of the previous selections should be removed from the stream of data in order to satisfy the request without exceeding the bandwidth of a listening device.

If the warning bit has a value equal to a logical one, then the sourcing device will reject a selection request if it cannot be validated because it will exceed the bandwidth capabilities of a device. In the response frame transmitted from the sourcing device to the requesting device, the sourcing device will include an error message specifying why the selection request was rejected. When the requesting device then receives this error message, the requesting device will examine the error message and determine whether or not the user should be notified. Preferably, the requesting device will notify the user when the error is caused because the additional selection would have exceeded the bandwidth of one of the devices. The user can then resubmit the request with a warning bit set to a logical zero and let the sourcing device determine which selections to remove in order to add the requested selection. The user could also specify that all or a portion of the current selections should be removed from the stream of data and then resubmit the request to the sourcing device. If the user determines that none of the current selections should be removed from the stream of data, the user can decide to not resubmit the request at the current time.

The bandwidth capabilities of the sourcing device are also managed within the preferred embodiment of the present invention. In the case where a selection is made which would exceed the bandwidth capabilities of the sourcing device, the sourcing device will manage the situation as described above with respect to listening devices. If the warning bit within the selection request has a value equal to a logical zero, the sourcing device will determine the appropriate selections to clear in order to free the necessary bandwidth to implement the requested selection, as described above. If the warning bit within the selection request has a value equal to a logical one, the selection request is rejected and an error message is sent to the requesting device. The user can then determine whether or not the request should be resubmitted. If the request is resubmitted, the user will either specify the selections to be cleared or will set the warning bit to a logical zero.

In operation, when the sourcing device receives a selection request from a controlling device, the sourcing device first attempts to validate the request by determining if the addition of the selection will result in the bandwidth capabilities of the sourcing device or any devices listening to the corresponding source plug being exceeded. If the selection can be added to the data stream without exceeding the bandwidth capabilities of any device, the sourcing device adds the selection to the data stream transmitted through the source plug and associates the selection with the requesting device. If the selection cannot be added to the data stream without exceeding the capabilities of a device, the sourcing device then determines the status of the warning bit within the request. If the warning bit is set to a logical zero, the sourcing device will eliminate appropriate selections from the existing data stream and then add the requested selection to the data stream transmitted through the source plug and associate the selection with the requesting device. If the warning bit is equal to a logical one, the sourcing device will reject the selection request and send an error message to the requesting controller specifying why the selection request was rejected.

When the sourcing device receives a clear command, the sourcing device determines the value of the scope bit within the clear command. If the scope bit is set to a logical zero, then the sourcing device disassociates all devices from the specified selection or selections and then clears the selection or selections from the stream of data transmitted through the source plug. If the scope bit is equal to a logical one, the sourcing device disassociates the requesting device from the selections to be cleared and determines if any other devices are associated with the selections to be cleared. If no other device is associated with the selections to be cleared, then the selections are cleared by the sourcing device. Otherwise, if another device is still associated with the selection, that selection is not cleared.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures, including other or later versions of the IEEE 1394 serial bus. It will also be apparent to those skilled in the art that while the preferred embodiment of the present invention utilizes the AV/C Command Set and protocol for transmissions over the IEEE 1394 serial bus, the present invention could also be implemented using any other appropriate protocols such as the Common Application Language (CAL) protocol.

I claim:

1. A method of distributing content selections within a single data stream to a network including a plurality of devices comprising:
   a. adding a content selection requested by a requesting device to the single data stream;
   b. incrementing a count value when adding is completed and further incrementing the count value each time the content selection is subsequently requested;
   c. decrementing the count value each time a clear command for the content selection is received; and
   d. clearing the content selection from the single data stream when the count value is equal to zero.

2. The method as claimed in claim 1 wherein the clear command includes a scope notification specifying whether or not the clear command is to clear the content selection regardless of the count value.

3. The method as claimed in claim 2 further comprising clearing the content selection if the clear command is to clear the content selection regardless of the count value.

4. The method as claimed in claim 3 wherein the scope notification is a single bit.

5. The method as claimed in claim 4 wherein the network is an IEEE 1394 serial bus network.

6. The method as claimed in claim 5 wherein the plurality of devices includes one or more sourcing devices and one or more listening devices.

7. The method as claimed in claim 6 wherein the requesting device is one of the one or more listening devices.

8. The method as claimed in claim 5 wherein the single data stream is transmitted through a single source plug of a sourcing device.

9. The method of claim 2 wherein any requesting device has ability to use the scope notification to clear the content selection.

* * * * *